(12) United States Patent
Miyahara et al.

(10) Patent No.: US 6,860,526 B2
(45) Date of Patent: Mar. 1, 2005

(54) COUPLING STRUCTURE FOR A HOLLOW BODY

(75) Inventors: Yutaka Miyahara, Higashihiroshima (JP); Toshiki Miyachi, Higashihiroshima (JP); Yoshihiro Akiyama, Wako (JP)

(73) Assignees: GP Daikyo Corporation, Hiroshima (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/611,427

(22) Filed: Jul. 2, 2003

(65) Prior Publication Data

US 2004/0145177 A1 Jul. 29, 2004

(30) Foreign Application Priority Data

Jul. 2, 2002 (JP) ........................................ 2002-193867

(51) Int. Cl.[7] ................................................ F16L 23/00
(52) U.S. Cl. ..................... 285/416; 285/288.1; 210/445; 403/282; 403/344
(58) Field of Search ........................... 285/288.1, 288.2, 285/288.3, 288.4, 416; 210/445, 451, 453; 220/584, 4.21, 4.24, 4.25; 403/282, 344

(56) References Cited

U.S. PATENT DOCUMENTS 5,965,019 A * 10/1999 Olsen et al. ................. 210/331
6,131,573 A * 10/2000 Brown .................... 128/205.27
6,209,541 B1 * 4/2001 Wallace .................. 128/205.27

FOREIGN PATENT DOCUMENTS

| JP | 9123931 | * | 5/1997 |
| JP | 9123932 | * | 5/1997 |
| JP | 11-042709 | | 2/1999 |
| JP | 2001-280207 | | 10/2001 |

* cited by examiner

Primary Examiner—David Bochna
(74) Attorney, Agent, or Firm—Nixon & Vanderhye, P.C.; Frank P. Presta (57) ABSTRACT

A first half part includes a second raised portion and a third raised portion respectively on the inner side of the hollow body and on the outer side of the hollow body with respect to a first raised portion, the second raised portion and the third raised portion being separated from the first raised portion with a spacing and being lower than the first raised portion. A second half part includes a third raised portion on the outer side of the hollow body with respect to a first raised portion, the third raised portion being separated from the first raised portion with a spacing and being lower than the first raised portion. An internal member includes a second raised portion on the inner side of the hollow body with respect to a first raised portion, the second raised portion being separated from the first raised portion with a spacing and being lower than the first raised portion. As a result, there is provided a high quality hollow body that can be provided at low cost and is cosmetically appealing.

5 Claims, 12 Drawing Sheets

FIG. 2

OUTER SIDE OF HOLLOW BODY ←  → INNER SIDE OF HOLLOW BODY

(HEATING)

FIG. 3 (b)

(COUPLING)

COUPLING STRUCTURE FOR A HOLLOW BODY

FIELD OF THE INVENTION

The present invention relates to a coupling structure for a hollow body in which two half parts are coupled to each other with an internal member, to be provided inside the hollow body, fitted with the half part.

BACKGROUND OF THE INVENTION

Oil strainers are one example of a product form of a hollow body, in which two half parts are coupled to each other with an internal member fitted with the half part so that the internal member is provided inside the hollow body. The oil strainer is a component for filtering the engine oil used for the lubrication of automobile engines. The oil strainer includes an oil filter, which is the internal member fitted into the half parts.

Techniques for coupling two half parts in an oil strainer are disclosed in Japanese Publication for Unexamined Publication Nos. 42709/1999 (Tokukaihei 11-42709, published on Feb. 16, 1999) (Prior art 1), and 2001-280207 (published on Oct. 10, 2001) (Prior art 2).

Figure 9:
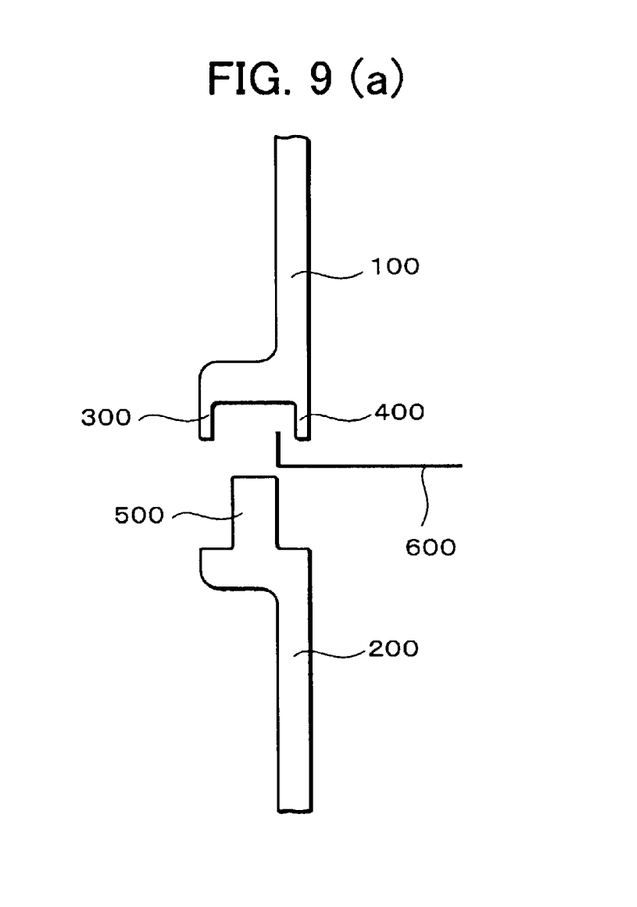
FIG. 9(a) is a cross sectional view showing a conventional coupling structure for a hollow body.
FIG. 9(b) is a cross sectional view showing a state in which an upper half part and a lower half part shown in FIG. 9(a) are coupled to each other.

Prior art 1 describes roughly three different structures for two half parts. In one structure, as shown in FIG. 9(a), an upper half part 100 has raised portions 300 and 400 that extend from the sides of the upper half part 100 on the surface facing a lower half part 200. The lower half part 200 has a raised portion 500 that extends from a central portion of the surface facing the upper half part 100. The upper half part 100 and the lower half part 200 having the foregoing constructions are welded to each other by vibration welding to incorporate an oil filter 600, as shown in FIG. 9(b).

Figure 10:
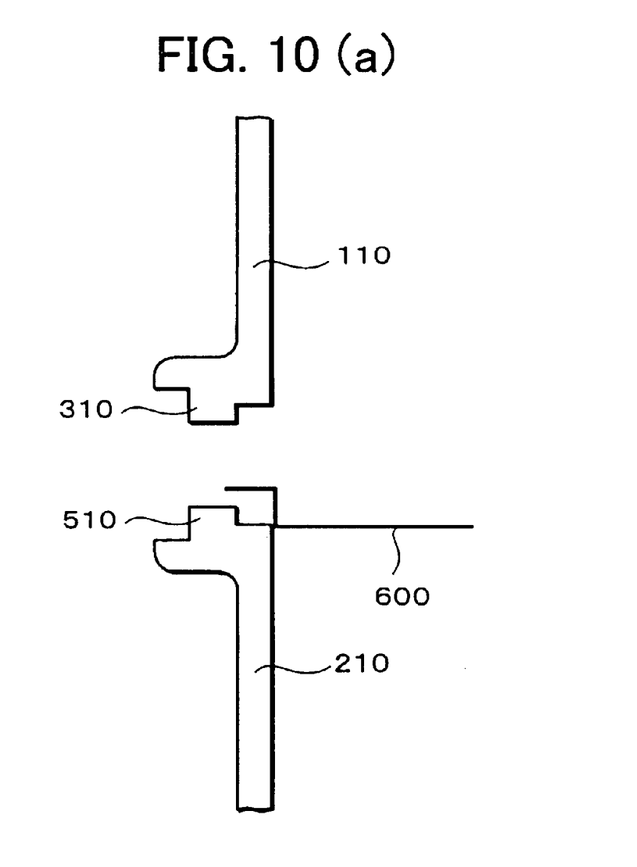
FIG. 10(a) is a cross sectional view showing a conventional coupling structure for a hollow body.
FIG. 10(b) is a cross sectional view showing a state in which an upper half part and a lower half part shown in FIG. 10(a) are coupled to each other.

In the second structure, as shown in FIG. 10(a), an upper half part 110 has a raised portion 310 that extends from a central portion of the surface facing a lower half part 210. The lower half part 210 has a raised portion 510 that extends from a central portion of the surface facing the upper half part 110. The upper half part 110 and the lower half part 210 having the foregoing constructions are welded to each other by heat-plate welding to incorporate the oil filter 600, as shown in FIG. 10(b).

Figure 11:
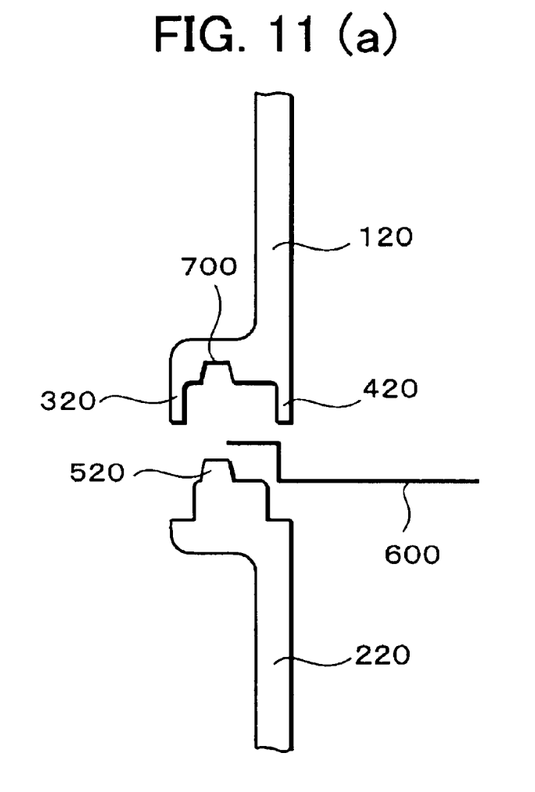
FIG. 11(a) is a cross sectional view showing a conventional coupling structure for a hollow body.
FIG. 11(b) is a cross sectional view showing a state in which an upper half part and a lower half part shown in FIG. 11(a) are coupled to each other.

In the third structure, as shown in FIG. 11(a), an upper half part 120 has two raised portions 320 and 420 that extend from the sides of the upper half part 120 and from the surface facing a lower half part 220. The lower half part 220 has a raised portion 520 that extend from a central portion of the surface facing the upper half part 120. The upper half part 120 also has a recessed portion 700, corresponding in shape to the raised portion 520, on the surface facing the lower half part 220. The upper half part 210 and the lower half part 220 having the foregoing constructions are welded to each other by spin welding to incorporate the oil filter 600, as shown in FIG. 11(b).

Figure 12:
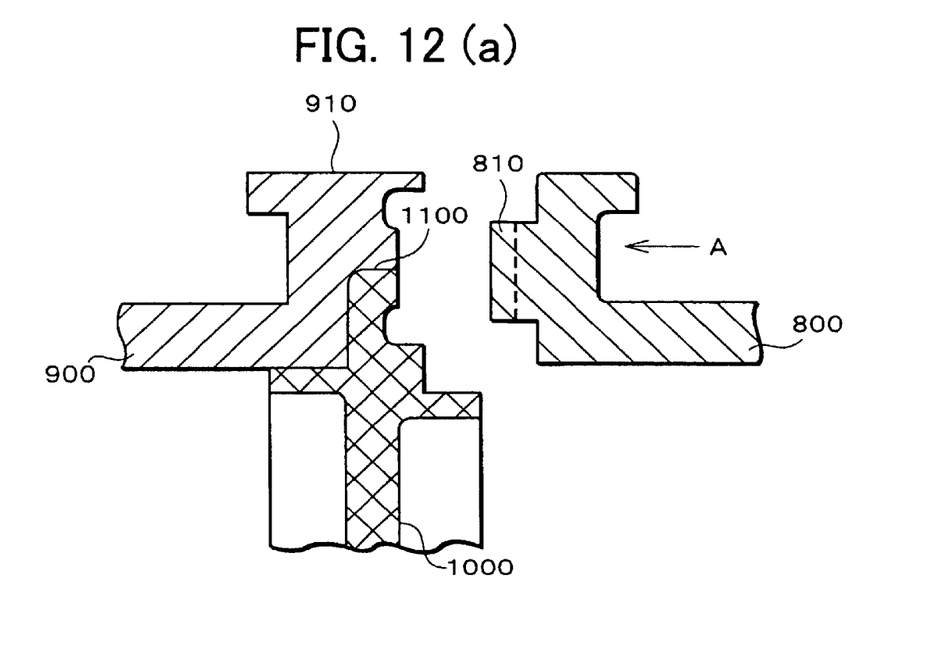
FIG. 12(a) is a cross sectional view showing a conventional coupling structure for a hollow body.
FIG. 12(b) is a cross sectional view showing a state in which an upper half part and a lower half part shown in FIG. 12(a) are coupled to each other.

In the technique disclosed in Prior art 2, as shown in FIG. 12(a), an upper half part 800 is moved toward a lower half part 900 (in the direction of arrow A in FIG. 12(a)), so as to weld an oil filter 1000 by vibration welding between the upper half part 800 and the lower half part 900. The upper half part 800 has a raised portion 810 that extends from a central portion of the surface facing the lower half part 900. The lower half part 900 has a raised portion 910 that extends from one side of the lower half part 900 on the surface facing the upper half part 800. The lower half part 900, together with the oil filter 1000, forms a raised portion 1100 on a position facing the raised portion 810 of the upper half part 800.

One problem of the foregoing prior art techniques, however, is that they are not suitable for coupling two half parts by heat welding. The following discusses the reasons why such a problem is caused.

In the technique disclosed in Prior art 1, when the upper and lower half parts are to be coupled to each other using a flat heat plate, the heat plate needs to be placed between the upper half part 100 and the lower half part 200, as shown in FIG. 9(a). Consequently, the heat plate is in contact with the raised portions 300, 400, and 500.

The problem of this is that the heat plate in contact with the raised portions 300 and 400 melts the raised portions, and, in the state shown in FIG. 9(b), exposes the coupled site of the upper half part 100 and the lower half part 200, with the result that the final product is cosmetically unappealing. The heat plate may be modified to have a recessed portion that corresponds in shape to the raised portion 500, so as to prevent the raised portions 300 and 400 from being melted. However, this is not advantageous because the complex structure of the heat plate raises the manufacturing cost.

This problem also resides in the structure described with reference to FIG. 11(a) in connection with Prior art 1. Namely, the flat heat plate used to weld the half parts melts the raised portions 320 and 420 of the upper half part 120 when the half parts are welded. As a result, the coupled site of the upper half part 120 and the lower half part 220 is exposed.

The same problem is also caused in the structure described with reference to FIG. 12(a) in connection with Prior art 2. Namely, the flat heat plate used to weld the half parts melts the raised portion 910 of the lower half part 900, exposing the coupled site of the upper half part 800 and the lower half part 900. This problem occurs because the raised portion 910 is closer to the upper half part 800 than the raised portion 1100.

Meanwhile, the structure described with reference to FIG. 10(a) in connection with Prior art 1 is associated with the following problem. Namely, owning to the fact that the surface of the upper half part 110 facing the lower half part 210 does not have a raised portion that extends from a side portion of the surface, the coupled site of the raised portion 310 and the raised portion 510 is exposed when the half parts are coupled together. As a result, the appearance of the final product may be impaired as in the foregoing prior art techniques.

SUMMARY OF THE INVENTION

An object of the present invention is to provide a coupling structure for a hollow body, with which a high quality hollow body can be provided at low cost without impairing its appearance during welding.

In order to achieve the foregoing object, a coupling structure for a hollow body of the present invention includes a first half part and a second half part, the first half part and the second half part being coupled to each other to constitute the hollow body, the second half part being fitted with an internal member to be provided inside the hollow body, wherein the first half part, the second half part, and the internal member each includes a coupling face having a first raised portion that extends in a direction of coupling, wherein the first half part includes a second raised portion and a third raised portion respectively on the inner side of the hollow body and on the outer side of the hollow body with respect to the first raised portion of the first half part, the second raised portion and the third raised portion being separated from the first raised portion with a spacing, being lower than the first raised portion of the first half part, and extending in a direction of coupling, wherein the second half part includes a third raised portion on the outer side of the hollow body with respect to the first raised portion of the second half part, the third raised portion of the second half part being separated from the first raised portion of the second half part with a spacing, being lower than the first raised portion of the second half part, and extending toward the third raised portion of the first half part, wherein the internal member includes a second raised portion on the inner side of the hollow body with respect to the first raised portion of the internal member, the second raised portion of the internal member being separated from the first raised portion of the internal member with a spacing, being lower than the first raised portion of the internal member, and extending toward the second raised portion of the first half part, and wherein, in a state where the first raised portion of the first half part, the first raised portion of the second half part, and the first raised portion of the internal member are coupled to one another, the second raised portion of the first half part and the second raised portion of the internal member are in contact with each other, and the third raised portion of the first half part and the third raised portion of the second half part are in contact with each other.

According to this construction, the second raised portion is provided more toward the outer side of the hollow body than the first raised portion, and the third raised portion is provided more toward the inner side of the hollow body than the first raised portion. Therefore, the product hollow body becomes cosmetically unappealing when a heat plate melts the second raised portion before coupling is made. This is not desirable. On the other hand, when the heat plate melts the third raised portion before coupling is made, the flash generated during welding may enter the hollow body. In this case, the quality of the hollow body is impaired.

In the present invention, however, the first half part has the first raised portion that is higher than its second raised portion and third raised portion in the direction of coupling. In the second half part, the first raised portion is higher than the third raised portion in the direction of coupling. Further, in the internal member, the first raised portion is higher than the second raised portion in the direction of coupling.

With this construction, a flat heat plate inserted between the first half part and the second half part to heat-weld these half parts is first brought into contact with the respective first raised portions of the first half part, the second half part, and the internal member. Accordingly, the heat plate does not melt the second raised portions or the third raised portions during welding.

The flat heat plate can be readily prepared from commercially available raw materials, without any special processing. The use of a flat heat plate is advantageous because the flat face of the heat plate enables the first raised portions to be heated without moving the heat plate, even when the first raised portions are slightly displaced from their proper heating position. That is, the coupling structure for a hollow body of the present invention does not require the heat plate to be accurately aligned with the first raised portions, thereby improving operability of coupling.

As a result, there is provided a high quality hollow body that can be provided at low cost and is cosmetically appealing.

The first half part, the second half part, and the internal member include spacings, which are provided between the first raised portion and the second raised portion and between the first raised portion and the third raised portion. Therefore, the molten flash, which is generated when the first raised portion of the first half part, the first raised portion of the second half part, and the first raised portion of the internal member are coupled together, can be flown into any of the spacings.

Further, in a state where the first raised portions are coupled to one another, the second raised portion of the first half part and the second raised portion of the internal member are in contact with each other, and the third raised portion of the first half part and the third raised portion of the second half part are in contact with each other. This prevents the molten flash flown into the spacings from leaking into or out of the hollow body. The present invention is also advantageous in this respect in providing a cosmetically appealing high quality hollow body.

For a fuller understanding of the nature and advantages of the invention, reference should be made to the ensuing detailed description taken in conjunction with the accompanying drawings.

DESCRIPTION OF THE EMBODIMENTS

One embodiment of the present invention is described below with reference to the attached drawings.

Figure 1:
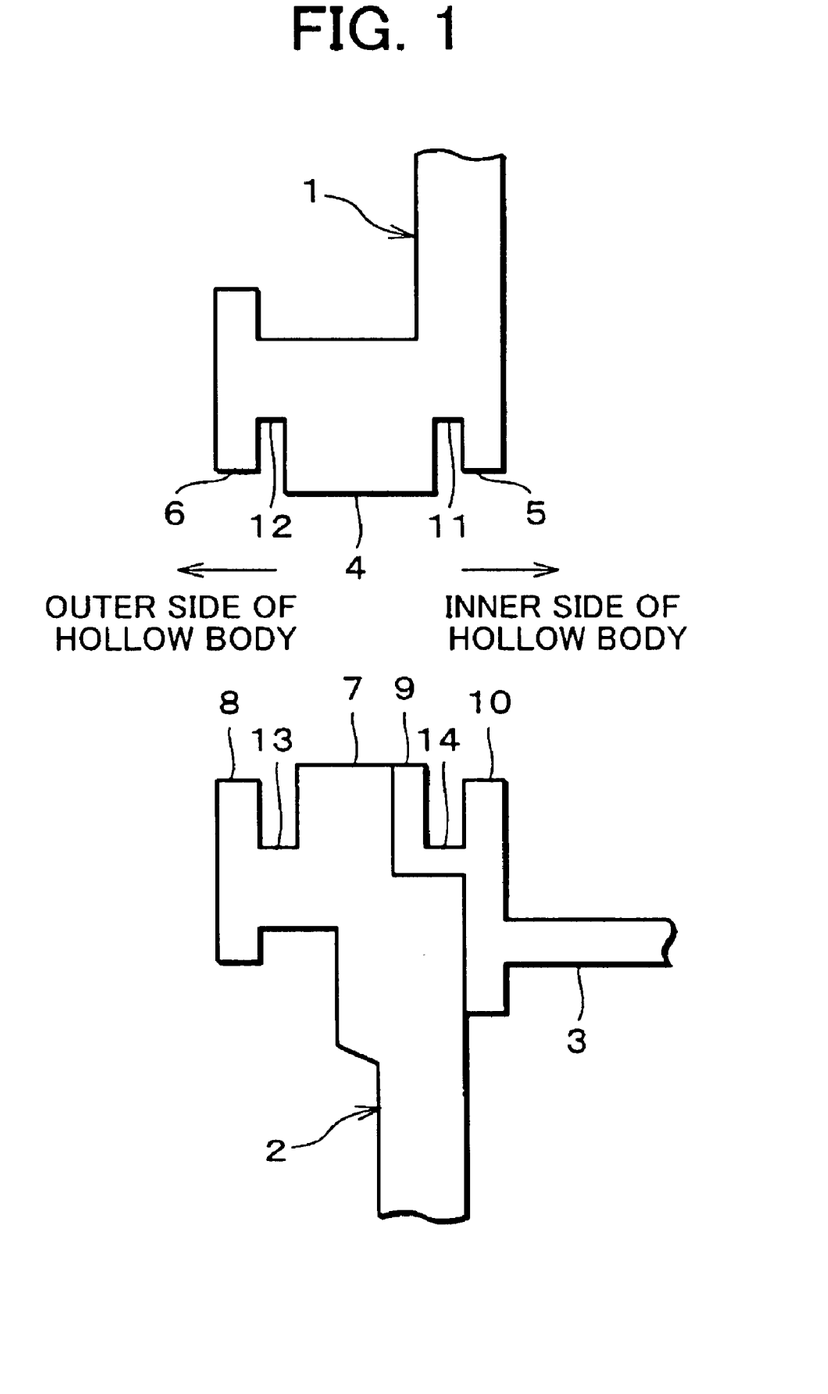
FIG. 1 is a cross sectional view showing one embodiment of a coupling structure for a hollow body according to the present invention.

FIG. 1 shows a coupling structure of the present embodiment, in which a first half part 1 and a second half part 2 are coupled to each other with a filter (internal member) 3 placed therebetween. By being coupled to each other, the first half part 1 and the second half part 2 form a hollow body (not shown), the filter 3 being placed inside the hollow body. The hollow body includes an oil inlet and an oil outlet (neither is shown).

The first half part 1 has a first raised portion 4 that extends toward the second half part 2 from a central portion of the surface facing the second half part 2. The first half part 1 also has a second raised portion 5 that extends toward the filter 3 from a side portion of the surface facing the second half part 2, on the inner side of the hollow body. Further, the first half part 1 has a third raised portion 6 that extends toward the second half part 2 from a side portion of the surface facing the second half part 2 on the outer side of the hollow body.

The first raised portion 4 of the first half part 1 has a height about 0.5 mm to 1.0 mm higher than that of the second raised portion 5 or the third raised portion 6 in the direction of extension toward the second half part 2. Between the first raised portion 4 and the second raised portion 5 is a spacing 11. Between the first raised portion 4 and the third raised portion 6 is a spacing 12.

The second half part 2 has a first raised portion 7 that extends toward the first raised portion 4 of the first half part 1. Further, the second half part 2 has a third raised portion 8 that extends toward the third raised portion 6 of the first half part 1. The first raised portion 7 has a height about 0.5 mm to 1.0 mm higher than that of the third raised portion 8 in the direction of extension toward the first half part 1. Between the first raised portion 7 and the third raised portion 8 is a spacing 13.

The filter 3 has a first raised portion 9 that extends toward the first raised portion 4 of the first half part 1, and a second raised portion 10 that extends toward the second raised portion 5 of the first half part 1. The first raised portion 7 of the second half part 2 and the first raised portion 9 of the filter 3 are formed such that the surfaces of the first raised portion 7 and the first raised portion 9 opposite the first raised portion 4 of the first half part 1 make up a flat surface. The first raised portion 9 has a height about 0.5 mm to 1.0 mm higher than that of the second raised portion 10 in the direction of extension toward the first half part 1. Between the first raised portion 9 and the second raised portion 10 is a spacing 14.

The side surface of the first raised portion 9 of the filter 3 on the side of the second half part 2 substantially conforms to the shape of the side surface of the first raised portion 7 of the second half part 2 on the side of the filter 3. This ensures that the filter 3 is firmly secured along the inner surface of the second half part 2.

The first half part 1, the second half part 2, and the filter 3 are formed, for example, by injection molding, using a thermoplastic material such as ABS resin, PP resin, and PA resin, or by using a material prepared by adding a reinforcing fiber to these thermoplastic materials.

Figure 2:
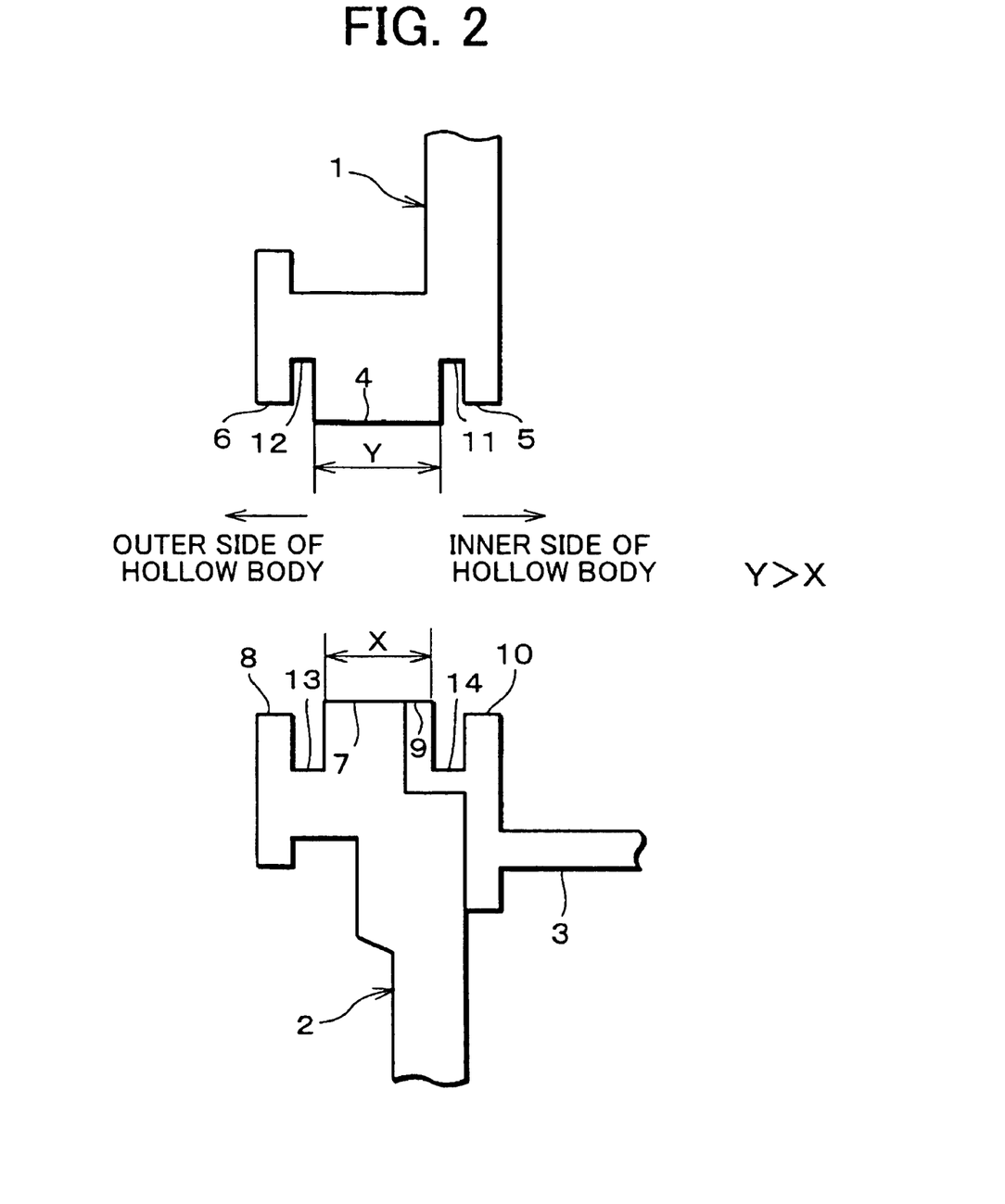
FIG. 2 is a cross sectional view showing a relationship between a first raised portion of a first half part, a first raised portion of a second half part, and a first raised portion of a filter with regard to their widths in the coupling structure of FIG. 1.

It is preferable that the first raised portion 4 of the first half part 1 has a width (Y) wider than a length (X), the length (X) being the sum of the width of the first raised portion 7 of the second half part 2 and the width of the first raised portion 9 of the filter 3, as shown in FIG. 2. That is, it is preferable that the side surface of the first raised portion 4 of the first half part 1 on the outer side of the hollow body is positioned more toward the outer side of the hollow body than the side surface of the first raised portion 7 of the second half part 2 on the outer side of the hollow body, and that the side surface of the first raised portion 4 of the first half part 1 on the inner side of the hollow body is positioned more toward the inner side of the hollow body than the side surface of the first raised portion 9 of the filter 3 on the inner side of the hollow body. The advantages of this will be described later.

Specifically, Y is preferably greater than X by about 1 mm. More specifically, it is preferable that X=3 mm, and Y=4 mm.

Figure 3:
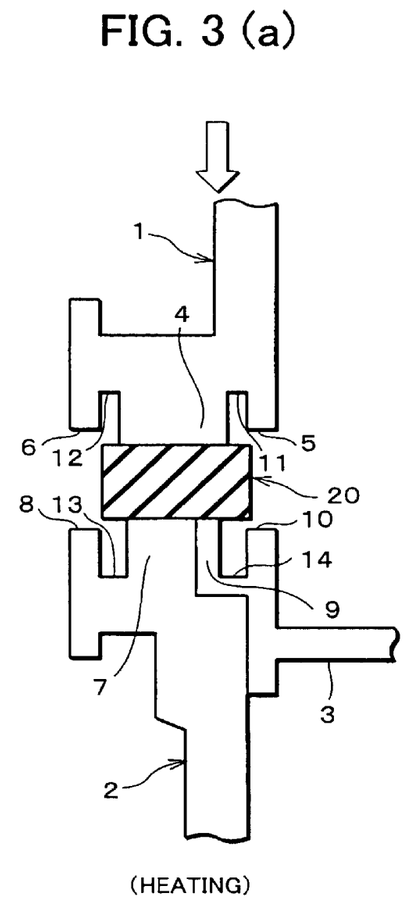
FIG. 3(a) is a cross sectional view showing a state in which a heat plate is used to heat the first half part and the second half part of the coupling structure shown in FIG. 1.
FIG. 3(b) is a cross sectional view showing a state in which the first half part and the second half part of the coupling structure shown in FIG. 1 are coupled to each other by applying pressure.

Referring to FIG. 3(a) and FIG. 3(b), the following describes procedures for coupling the first half body 1, the second half body 2, and the filter 3 respectively having the foregoing constructions.

As FIG. 3(a) illustrates, when coupling the first half part 1 and the second half part 2 together, a heat plate 20 is placed between the first raised portion 4 of the first half part 1 and the first raised portions 7 and 9 of the second half part 2 and the filter 3. In response, the first raised portion 4 of the first half part 1, the first raised portion 7 of the second half part 2, and the first raised portion 9 of the filter 3 start to melt. Preferably, a clearance of 0 mm to 2 mm is provided between the heat plate 20 and the first raised portion 4 and between the heat plate 20 and the first raised portions 7 and 9.

Here, the surface temperature of the heat plate 20 is 500° C. to 650° C., when a PA resin containing 35% glass fiber is used as the thermoplastic resin material of the heat plate 20. In this case, the duration of heating is 15 seconds to 30 seconds.

Then, the first half part 1 is pressed against the second half part 2. In applying pressure, the heat plate 20 does not melt the second raised portion 5 and the third raised portion 6 of the first half part 1, the third raised portion 8 of the second half part 2, or the second raised portion 10 of the filter 3. This is because the second raised portion 5 and the third raised portion 6 of the first half part 1 are lower than the first raised portion 4 in the direction of extension toward the second half part 2, and because the third raised portion 8 of the second half part 2 is lower than the first raised portion 7 in the direction of extension toward the first half part 1, and because the second raised portion 10 of the filter 3 is lower than the first raised portion 9 in the direction of extension toward the first half part 1.

By applying pressure, the first half part 1, the second half part 2, and the filter 3 are coupled together, as shown in FIG. 3(b). By being coupled, the second raised portion 5 of the first half part 1 is mated with the second raised portion 10 of the filter 3, and the third raised portion 6 of the first half part 1 is mated with the third raised portion 8 of the second half part 2. The second raised portions 5 and 10 and the third raised portions 6 and 8 can assume such a configuration because the heat of the heat plate 20 does not melt these raised portions when applying pressure. As a result, the coupling site of the first half part 1 and the second half part 2 are prevented from being exposed to outside.

As described, the width (Y) of the first raised portion 4 of the first half part 1 is wider than the combined length (X) of the width of the first raised portion 7 of the second half part 2 and the width of the first raised portion 9 of the filter 3 (see FIG. 2). Thus, the flash 20a that generates in the heat welding of the first raised portion 4 of the first half part 1 with the first raised portion 7 of the second half part 2 and the first raised portion 9 of the filter 3 is pushed into the spacing 13 or 14 by the first raised portion 9 of the first half part 1. Therefore, the flash 20a produced during heat welding does not flow into the hollow body from the coupling site. As a result, the filter 3 will not be clogged by the flash 20a generated during welding.

In the described embodiment, the width (Y) of the first raised portion 4 of the first half part 1 is wider than the combined length (X) of the width of the first raised portion 7 of the second half part 2 and the width of the first raised portion 9 of the filter 3. The present invention, however, is not just limited to this configuration.

Figure 4:
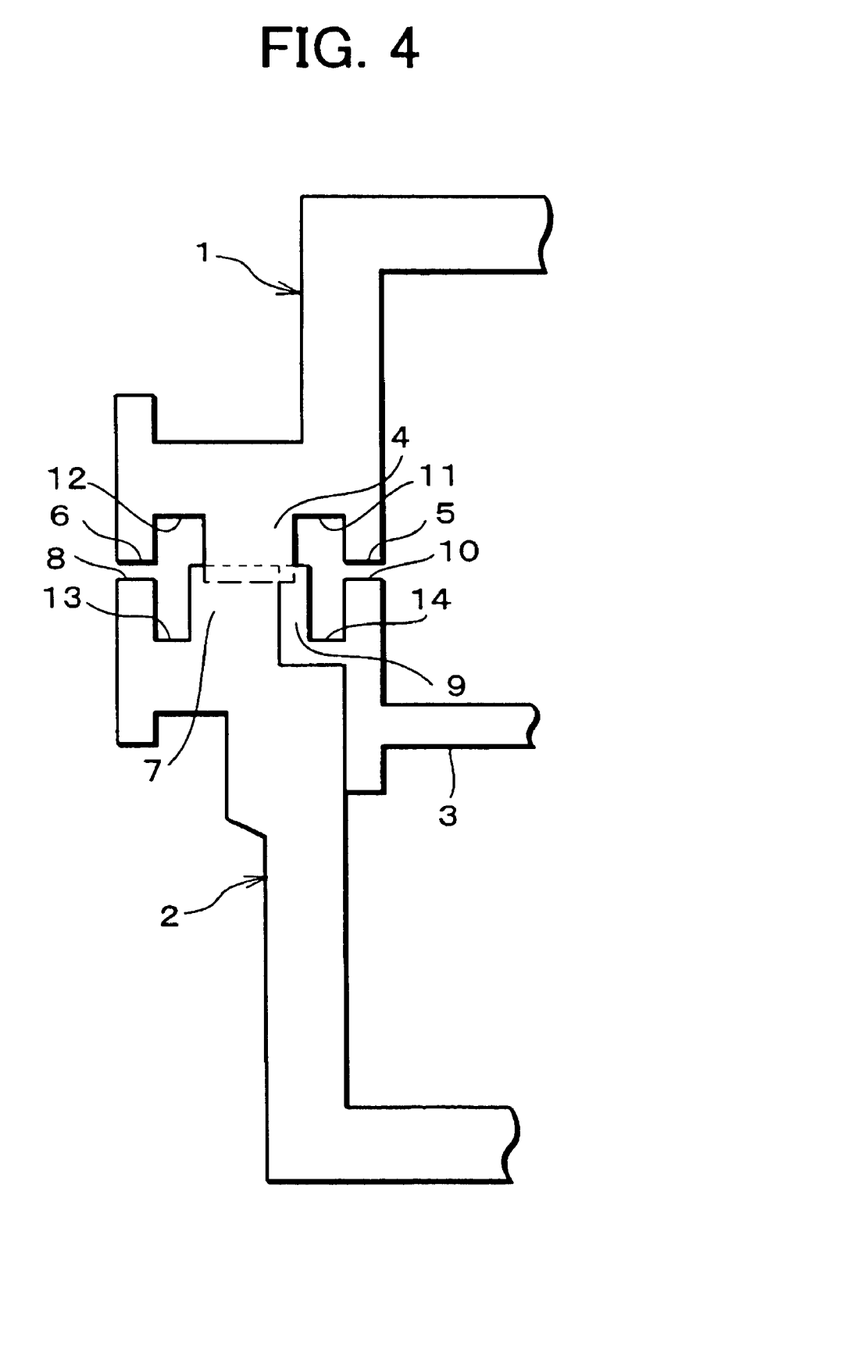
FIG. 4 is a cross sectional view showing another embodiment of the coupling structure for a hollow body according to the present invention.

As shown in FIG. 4, the width (Y) of the first raised portion 4 of the first half part 1 may be shorter than the combined length (X) of the width of the first raised portion 7 of the second half part 2 and the width of the first raised portion 9 of the filter 3. That is, the side surface of the first raised portion 4 of the first half part 1 on the outer side of the hollow body may be positioned more toward the inner side of the hollow body than the side surface of the first raised portion 7 of the second half part 2 on the outer side of the hollow body, and the side surface of the first raised portion 4 of the first half part 1 on the inner side of the hollow body may be positioned more toward the outer side of the hollow body than the side surface of the first raised portion 9 of the filter 3 on the inner side of the hollow body.

With this configuration, by moving the second half part 2 toward the first half part 1 in press welding, the flash that generates during welding flows into the spacing 11 or 12 of the first half part 1.

Further, the width (Y) of the first raised portion 4 of the first half part 1 may be substantially equal to the combined length (X) of the first raised portion 7 of the second half part 2 and the first raised portion 9 of the filter 3.

Figure 5:
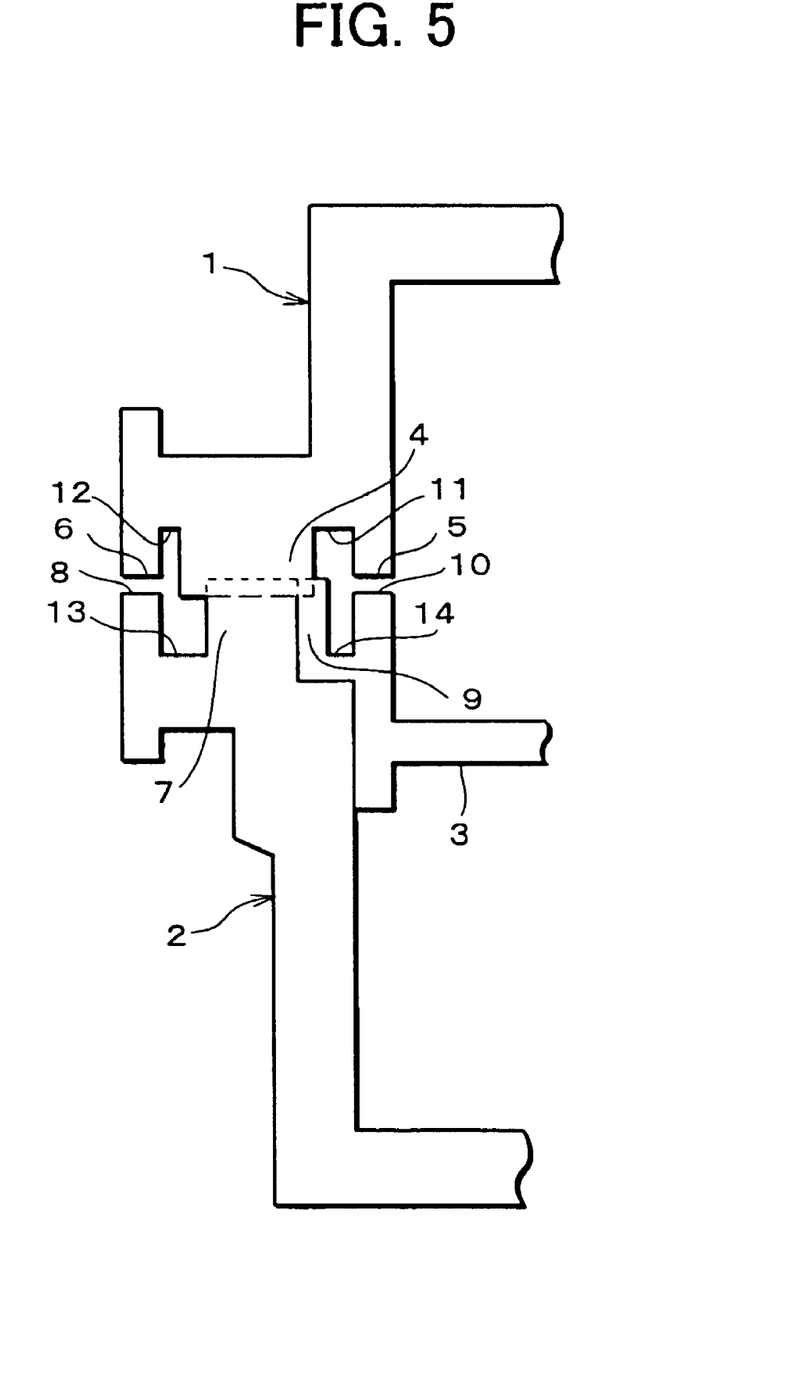
FIG. 5 is a cross sectional view showing yet another embodiment of the coupling structure for a hollow body according to the present invention.

In this case, as shown in FIG. 5, the side surface of the first raised portion 4 of the first half part 1 on the outer side of the hollow body may be positioned more toward the outer side of the hollow body than the side surface of the first raised portion 7 of the second half part 2 on the outer side of the hollow body, and the side surface of the first raised portion 4 of the first half part 1 on the inner side of the hollow body may be positioned more toward the outer side of the hollow body than the side surface of the first raised portion 9 of the filter 3 on the inner side of the hollow body.

With this configuration, by moving the second half part 2 toward the first half part 1 in press welding, the flash that generates during welding flows into the spacing 13 of the second half part 2 or the spacing 11 of the first half part 1.

Figure 6:
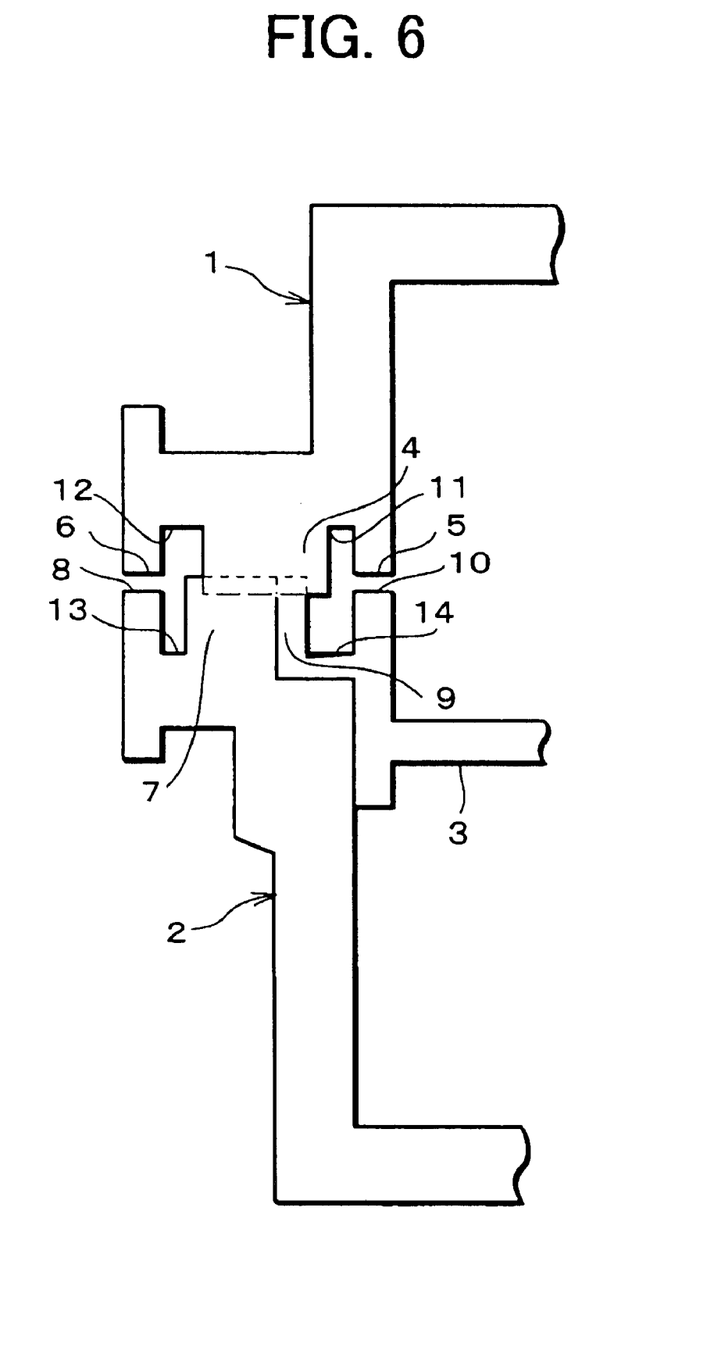
FIG. 6 is a cross sectional view showing still another embodiment of the coupling structure for a hollow body according to the present invention.

Alternatively, as shown in FIG. 6, the side surface of the first raised portion 4 of the first half part 1 on the outer side of the hollow body may be positioned more toward the inner side of the hollow body than the side surface of the first raised portion 7 of the second half part 2 on the outer side of the hollow body, and the side surface of the first raised portion 4 of the first half part 1 on the inner side of the hollow body may be positioned more toward the inner side of the hollow body than the side surface of the first raised portion 9 of the filter 3 on the inner side of the hollow body.

With this configuration, by moving the second half part 2 toward the first half part 1 in press welding, the flash that generates during welding flows into the spacing 12 of the first half part 1 or the spacing 14 of the filter 3.

By thus suitably changing the positional relationship between the first raised portion 4 of the first half part 1, the first raised portion 7 of the second half part 2, and the first raised portion 9 of the filter 3, the flash that generates during press welding can be channeled into any of the spacings in a controlled manner. This allows for designing according to the site the flash flows into during press welding. For example, when the flash flows into the spacing 14 of the filter 3, a resin with superior heat resistance may be used for the filter 3. Further, because the flash after the press welding flows into the spacing but does not spread horizontally, the width of the spacing can be made shorter to reduce the total width of the welding area, thereby realizing a more compact structure.

In the described embodiment, the first raised portion 7 of the second half part 2 and the first raised portion 9 of the filter 3 are formed such that the surfaces of the first raised portions 7 and 9 opposite the first raised portion 4 of the first half part 1 make up a flat surface. The present invention, however, is not just limited to this configuration.

Figure 7:
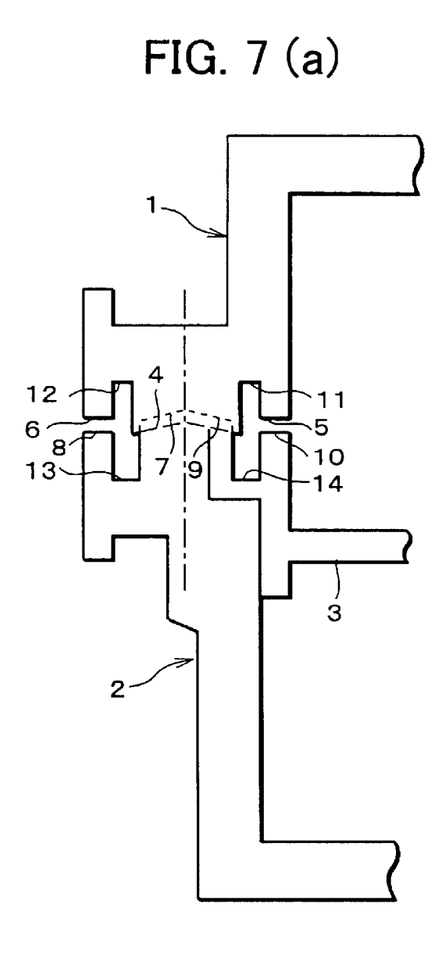
FIG. 7(a) and FIG. 7(b) are cross sectional views showing yet another embodiment of the coupling structure for a hollow body according to the present invention.

As shown in FIG. 7(a), the surface of the first raised portion 4 of the first half part 1 facing the second half part 2 may have a laterally symmetrical reversed M-shape. In addition, the first raised portion 7 of the second half part 2 and the first raised portion 9 of the filter 3 are formed such that the surfaces of the first raised portions 7 and 9 opposite the first raised portion 4 of the first half part 1 have a laterally symmetrical reversed V-shape, corresponding to the reversed M-shape of the first raised portion 4.

Alternatively, the surface of the first raised portion 4 of the first half part 1 opposite the second half part 2 may have a laterally asymmetrical reversed M-shape, as shown in FIG. 7(b). In this case, the first raised portion 7 of the second half part 2 and the first raised portion 9 of the filter 3 are formed such that the surfaces of the first raised portions 7 and 9 opposite the first raised portion 4 of the first half part 1 have a laterally asymmetrical reversed V-shape, corresponding to the laterally asymmetrical reversed M-shape of the first raised portion 4.

In either configuration shown in FIG. 7(a) or FIG. 7(b), the first raised portion 4 of the first half part 1 and the first raised portions 7 and 9 of the second half part 2 and the filter 3 are formed such that their respective surfaces facing each other are inclined. The inclined surfaces, as opposed to the flat surfaces, increases the welding area for the first half part 1 and the second part 2 when they are welded. This increases the strength of welding between the first half part 1 and the second half part 2, thereby improving the reliability of product strength.

When the surface of the first raised portion 4 of the first half part 1 facing the second half part 2 is to be sloped, the slope angle with respect to the horizontal surface is preferably in a range of 1° to 45°, or more preferably 14° to 34°. Further, any deformation underwent by the first raised portion 9 of the filter 3 toward the inner side of the hollow body can be corrected during welding by the inclined surface of the first raised portion 4 of the first half part 1.

Alternatively, the surface of the first raised portion 4 of the first half part 1 facing the second half part 2 may have a circular arc shape that is recessed toward the first half part 1. In this case, the first raised portion 7 of the second half part 2 and the first raised portion 9 of the filter 3 may be formed such that the surfaces of the first raised portions 7 and 9 opposite the first raised portion 4 of the first half part 1 may be in the form of a circular arc that protrudes toward the first half part 1 to correspond to the circular arc surface of the first raised portion 4. With this configuration, it is possible, as with the foregoing configuration, to increase the welding area for the first half part and the second half part when they are welded, thereby improving the reliability of product strength.

Figure 8:
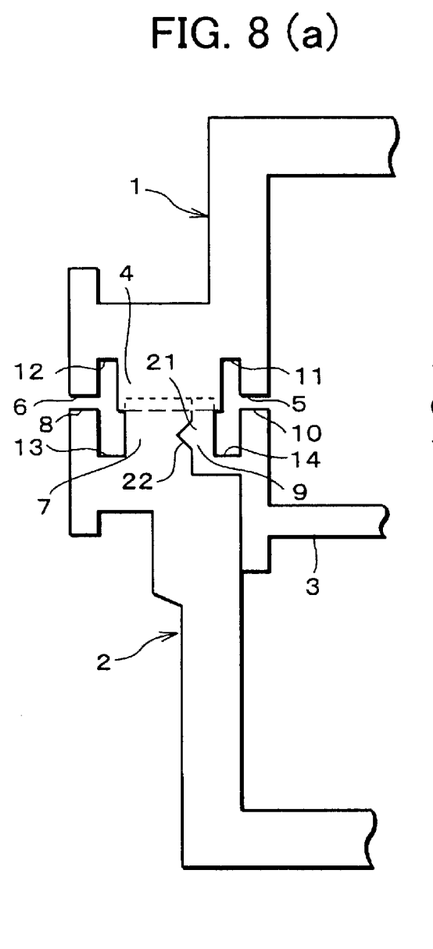
FIG. 8(a) and FIG. 8(b) are cross sectional views showing still another embodiment of the coupling structure for a hollow body according to the present invention.

Further, as shown in FIG. 8(a), the surface of the filter 3 in contact with the second half part 2 may be provided with a raised portion 21. In this case, the surface of the second half part 2 in contact with the filter 3 is provided with a recessed portion 22 that corresponds in shape with the raised portion 21. With this configuration, mating the raised portion 21 with the recessed portion 22 restricts movement of the filter 3, ensuring that the second half part 2 and the filter 3 are properly aligned in position.

The raised portion 21 and the recessed portion 22 may be provided in the foregoing configuration in which the surface of the first raised portion 4 of the first half part 1 facing the second half part 2 has a laterally asymmetrical reversed M-shape, as shown in FIG. 8(b). With this configuration, it is possible to increase the welding area for the first half part 1 and the second half part 2, thereby improving the reliability of strength, in addition to ensuring proper positioning.

As described, the coupling structure for a hollow body of the present embodiment includes the first half part 1 and the second half part 2, the first half part 1 and the second half part 2 being coupled to each other to constitute the hollow body, the second half part 2 being fitted with the filter 3 provided inside the hollow body. The first half part 1, the second half part 2, and the filter 3 include coupling faces respectively having the first raised portions 4, 7, and 9 that extend in a direction of coupling.

The first half part 1 includes the second raised portion 5 and the third raised portion 6 respectively on the inner side of the hollow body and on the outer side of the hollow body with respect to the first raised portion 4, the second raised portion 5 and the third raised portion 6 being separated from the first raised portion 4 with spacings, being lower than the first raised portion 4, and extending in a direction of coupling. The second half part 2 includes the third raised portion 8 on the outer side of the hollow body with respect to the first raised portion 7, the third raised portion 8 being separated from the first raised portion 7 with a spacing, being lower than the first raised portion 7, and extending toward the third raised portion 6 of the first half part 1. The filter 3 includes the second raised portion 10 on the inner side of the hollow body with respect to the first raised portion 9, the second raised portion 10 being separated from the first raised portion 9 with a spacing, being lower than the first raised portion 9, and extending toward the second raised portion 5 of the first half part 1.

Further, in the coupling structure for a hollow body of the present embodiment, when the first raised portion 4 of the first half part 1, the first raised portion 7 of the second half part 2, and the first raised portion 7 of the filter 3 are coupled to one another, the second raised portion 5 of the first half part 2 and the second raised portion 10 of the filter 3 are in contact with each other, and the third raised portion 6 of the first half part 1 and the third raised portion 8 of the second half part 2 are in contact with each other.

With this construction, a flat heat plate inserted between the first half part 1 and the second half part 2 to heat-weld these half parts is first brought into contact with the respective first raised portions 4, 7, and 9 of the first half part 1, the second half part 2, and the filter 3. Accordingly, the heat plate does not melt the second raised portions 5 and 10 or the third raised portions 6 and 8 during welding.

The flat heat plate can be readily prepared from commercially available raw materials, without any special processing. The use of a flat heat plate is advantageous because the flat face of the heat plate enables the first raised portions 4, 7, and 9 to be heated without moving the heat plate, even when the first raised portions 4, 7, and 9 are slightly displaced from their proper heating position. That is, the coupling structure for a hollow body of the present embodiment does not require the heat plate to be accurately aligned in position with the first raised portions 4, 7, and 9, thereby improving operability of coupling.

As a result, there is provided a high quality hollow body that can be provided at low cost and is cosmetically appealing.

The first half part 1, the second half part 2, and the filter 3 include the spacings 11 through 14, which are provided between the first raised portion and the second raised portion and between the first raised portion and the third raised portion. Therefore, the molten flash, which is generated when the first raised portion 4 of the first half part 1, the first raised portion 7 of the second half part 2, and the first raised portion 9 of the filter 3 are coupled to one another, can be flown into the spacings 11 through 14.

Further, in a state where the first raised portions 4, 7, and 9 are coupled to one another, the second raised portion 5 of the first half part 2 and the second raised portion 10 of the filter 3 are in contact with each other, and the third raised portion 6 of the first half part 1 and the third raised portion 8 of the second half part 2 are in contact with each other. This prevents the molten flash flown into the spacings 11 through 14 from leaking into or out of the hollow body. The present invention is also advantageous in this respect in providing a cosmetically appealing high quality hollow body.

In the coupling structure for a hollow body of the present embodiment, the first raised portion 4 of the first half part 1 has a width that is wider than a width of the first raised portion 7 of the second half part 2 and a width of the first raised portion 9 of the filter 3 combined together.

With this construction, when the molten flash is generated in coupling the first raised portion 4 of the first half part 1 with the first raised portion 7 of the second half part 2 and the first raised portion 9 of the filter 3, the first raised portion 4 of the first half part 1 having a wider width can push the molten flash into the spacing 13 between the first raised portion 7 and the third raised portion 8 of the second half part 2 or into the spacing 14 between the first raised portion 9 and the second raised portion 10 of the filter 3.

This allows for designing according to the predicted movement of the molten flash after coupling the first half part 1 and the second half part 2. For example, the first raised portion 7 of the second half part 2 can be designed to be thin, because the first raised portion 7 is reinforced by the molten flash that has been pushed into the spacing between the first raised portion 7 and the third raised portion 8. Similarly, the first raised portion 9 of the filter 3 can be designed to be thin, because the first raised portion 9 is reinforced by the molten flash that has been pushed into the spacing between the first raised portion 9 and the second raised portion 10. Further, because the flash after heat welding flows into the spacings 13 or 14 but does not spread horizontally, the total width of the welding area can be reduced and a more compact structure can be realized by reducing the widths of the spacings 13 and 14.

As a result, less material is required to form the second half part 2 and the filter 3, thus reducing the material cost.

In the coupling structure for a hollow body of the present embodiment, the surface of the first raised portion 4 of the first half part 1 facing the second half part 2 is recessed into the first half part 1, and the surface of the first raised portion 7 of the second half part 2 and the surface of the first raised portion 7 of the filter 3 together form such a protrusion that extends in a direction of coupling and that conforms to the recessed surface of the first raised portion 4 of the first half part 1. Preferably, the surface of the first raised portion 4 of the first half part 1 has a cross section in the form of a reversed M, and the surface of the first raised portion 7 of the second half part 2 and the surface of the first raised portion 9 of the filter 3 making up a surface opposite the first raised portion 4 of the first half part 1 have a cross section in the form of a reversed V.

According to this construction, the surface of the first raised portion of one half part facing the first raised portion of the other half part has either a recession or a protrusion. This is more advantageous than having a flat surface because the recessed or protruded surface increases the coupling area for the respective first raised portions. As a result, the first half part 1 and the second half part 2 can be coupled together more firmly.

The first raised portion 7 of the second half part 2 and the first raised portion 9 of the filter 3 together form a protrusion that corresponds in shape to the recession of the first raised portion 4 of the first half part 1. This enables the first half part 1 and the second half part 2 to be coupled together with the respective first raised portions 7 and 9 of the second half part 2 and the filter 3 held in place with the first raised portion 4 of the first half part 1. As a result, it is ensured that the first half part 1, the second half part 2, and the filter 3 are coupled together without any displacement of the respective members.

In the coupling structure for a hollow body of the present embodiment, the filter 3 according to the foregoing construction is an oil filter, and the hollow body according to the foregoing construction has an oil inlet and an oil outlet.

With this construction, the supplied oil to the hollow body through the oil inlet is filtered by the oil filter and ejected through the oil outlet. The hollow body is formed by coupling the first half part and the second half part of the described constructions, and accordingly the flash generated during welding does not enter the hollow body.

This prevents entry of the molten flash into the oil ejected through the oil outlet.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A coupling structure for a hollow body, comprising:
a first half part; and
a second half part,
the first half part and the second half part being coupled to each other to constitute the hollow body, the second half part being fitted with an internal member to be provided inside the hollow body,
wherein the first half part, the second half part, and the internal member each includes a coupling face having a first raised portion that extends in a direction of coupling,
wherein the first half part includes a second raised portion and a third raised portion respectively on the inner side of the hollow body and on the outer side of the hollow body with respect to the first raised portion of the first half part, the second raised portion and the third raised portion being separated from the first raised portion with a spacing, being shorter than the first raised portion of the first half part, and extending in a direction of coupling,
wherein the second half part includes a third raised portion on the outer side of the hollow body with respect to the first raised portion of the second half part, the third raised portion of the second half part being separated from the first raised portion of the second half part with a spacing, being shorter than the first raised portion of the second half part, and extending toward the third raised portion of the first half part,
wherein the internal member includes a second raised portion on the inner side of the hollow body with respect to the first raised portion of the internal member, the second raised portion of the internal member being separated from the first raised portion of the internal member with a spacing, being shorter than the first raised portion of the internal member, and extending toward the second raised portion of the first half part, and
wherein, in a state where the first raised portion of the first half part, the first raised portion of the second half part, and the first raised portion of the internal member are coupled to one another, the second raised portion of the first half part and the second raised portion of the internal member are in contact with each other, and the third raised portion of the first half part and the third raised portion of the second half part are in contact with each other.

2. The coupling structure for a hollow body as set forth in claim 1, wherein the first raised portion of the first half part has a width that is wider than a width of the first raised portion of the second half part and a width of the first raised portion of the internal member combined together.

3. The coupling structure for a hollow body as set forth in claim 1,
wherein a surface of the first raised portion of the first half part facing the second half part is recessed into the first half part, and
wherein a surface of the first raised portion of the second half part and a surface of the first raised portion of the internal member together form such a protrusion that extends in a direction of coupling and that conforms to the recessed surface of the first raised portion of the first half part.

4. The coupling structure for a hollow body as set forth in claim 3,
wherein the surface of the first raised portion of the first half part has a cross section in the form of a reversed M, and
wherein the surface of the first raised portion of the second half part and the surface of the first raised portion of the internal member has a cross section in the form of a reversed V.

5. The coupling structure for a hollow body as set forth in claim 1,
wherein the internal member is an oil filter, and
wherein the hollow body has an oil inlet and an oil outlet.

* * * * *